United States Patent [19]
Cole et al.

[11] Patent Number: 5,244,030
[45] Date of Patent: Sep. 14, 1993

[54] ELECTRICALLY OPERATED FOLDING OPERABLE WALLS

[76] Inventors: Fred Cole, 84 Dunlop Rd., Huntington, N.Y. 11743; Stephen Cole, 28 Pauchogue Ave., East Islip, N.Y. 11730

[21] Appl. No.: 778,473

[22] Filed: Oct. 17, 1991

[51] Int. Cl.$^5$ .................................. E05F 15/20
[52] U.S. Cl. ............................. 160/1; 340/556
[58] Field of Search ............... 160/1, 2, 7, 10, 188; 49/25, 31, 26, 27, 28; 340/541, 545, 555, 556, 557, 567

[56] References Cited

U.S. PATENT DOCUMENTS

| | | | |
|---|---|---|---|
| 2,909,718 | 10/1959 | Lawick | 49/25 X |
| 2,987,121 | 6/1961 | Haws | 160/188 |
| 3,446,264 | 5/1969 | Roemer | 160/188 |
| 3,852,592 | 12/1974 | Scoville et al. | 340/555 X |
| 4,447,726 | 5/1984 | Mudge et al. | 340/567 X |
| 4,707,604 | 11/1987 | Guscott | 340/567 X |
| 4,719,363 | 1/1983 | Gallacher | 340/555 X |
| 4,894,952 | 1/1990 | Trett et al. | 49/25 |
| 4,939,359 | 7/1990 | Freeman | 340/567 X |
| 5,107,120 | 4/1992 | Tom | 340/567 X |
| 5,152,332 | 10/1992 | Siener | 160/188 |

Primary Examiner—David M. Purol
Attorney, Agent, or Firm—Michael I. Kroll

[57] ABSTRACT

Electrically operated folding operable walls are provided that are controlled by an electrical operation circuit of the type having a key switch, a control panel, an extend limit switch, a stack limit switch, control relays and a motor. The invention consists of a mechanism for creating an infrared barrier curtain on opposite sides of an operating path of the folding operable walls. Another mechanism is for shutting down the electrical operation circuit of the folding operable walls when a physical obstruction enters into the operating path of the folding operable walls and interrupts the infrared barrier curtain. Still another mechanism is for restarting up the electrical operation circuit of the folding operable walls after the physical obstruction is removed from the operating path of the folding operable walls.

3 Claims, 3 Drawing Sheets

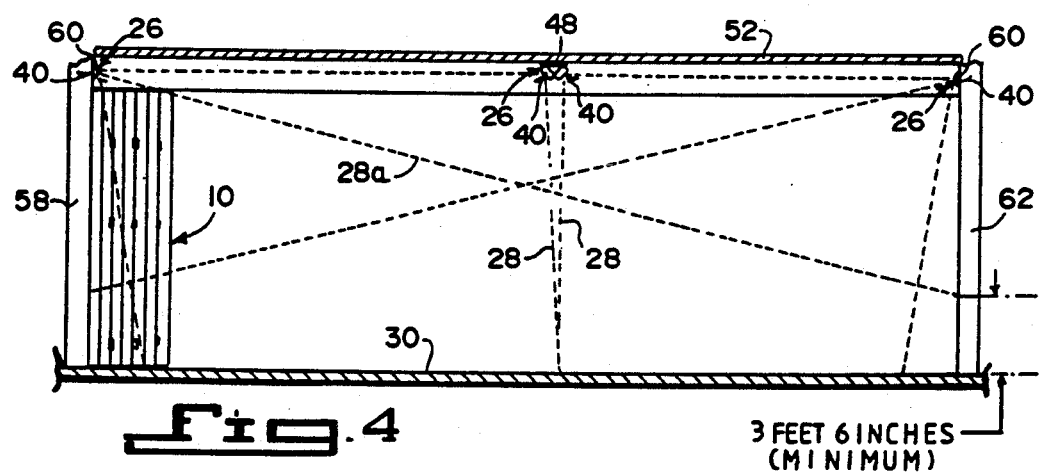
Fig. 4
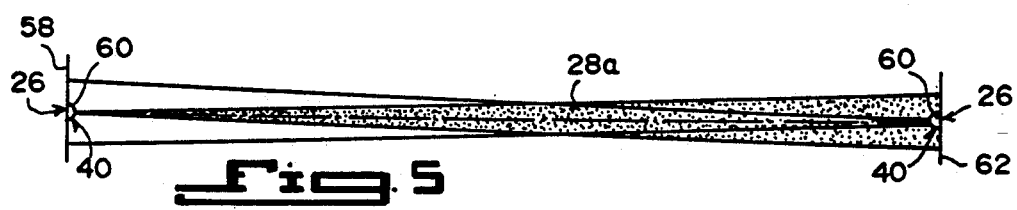
Fig. 5
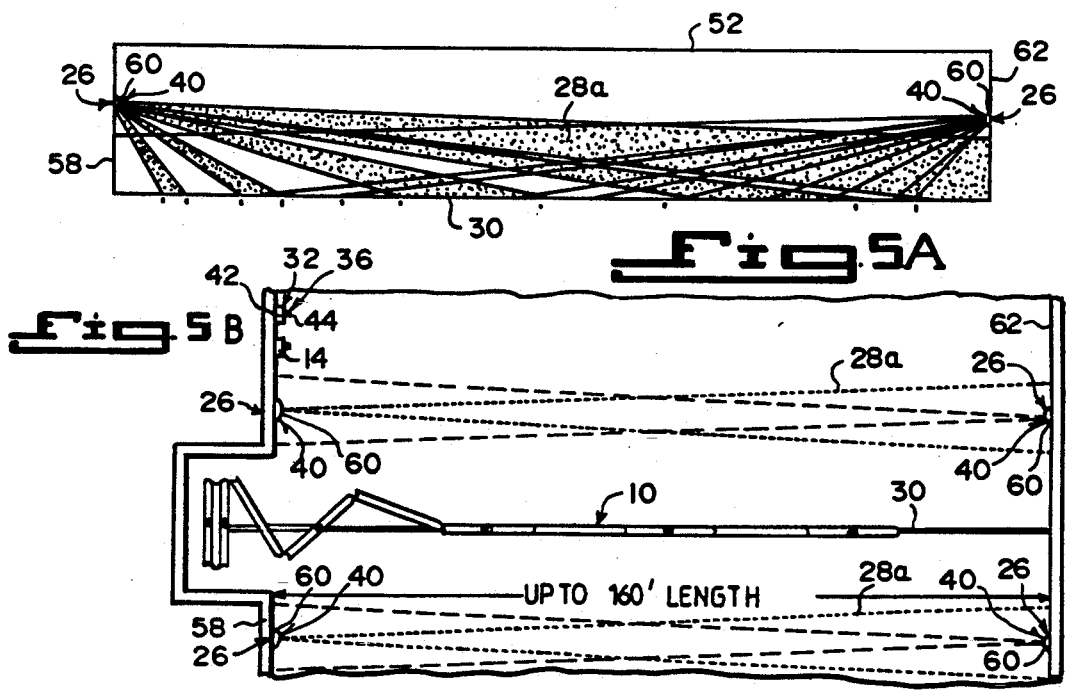
Fig. 5A
Fig. 5B

ELECTRICALLY OPERATED FOLDING OPERABLE WALLS

BACKGROUND OF THE INVENTION

1. Field of the Invention

The instant invention relates generally to moving gymnasium partitions and more specifically it relates to electrically operated folding operable walls.

2. Description of the Prior Art

Numerous moving gymnasium partitions have been provided in prior art that are adapted to include mechanisms which open and close the moving gymnasium partitions automatically by an electrical system, which can accidentally trap a person therebetween. While these units may be suitable for the particular purpose to which they address, they would not be as suitable for the purposes of the present invention as heretofore described.

SUMMARY OF THE INVENTION

A first object of the present invention is to provide electrically operated folding operable walls that will overcome the shortcomings of the prior art devices.

A second object is to provide electrically operated folding operable walls that will include a safety system to create an infrared barrier curtain at the operating path, so that an immediate shut down will occur if a physical obstruction enters into the operating path.

A third object is to provide electrically operated folding operable wall in which passive infrared sensors can be mounted to the ceiling or side walls to create the infrared barrier curtain at the operating path.

A fourth object is to provide electrically operated folding operable walls with no interference between the infrared barrier and an operator at a key control switch, as interference will hinder safe operating procedures.

A fifth object is to provide electrically operated folding operable walls, which will include a mechanism for arming and disarming the system, so as to operate the walls in either direction at any given time.

A sixth object is to provide electrically operated folding operable walls that are simple and easy to use.

A seventh object is to provide electrically operated folding operable walls that are economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 4 is a diagrammatic vertical cross sectional view showing both the ceiling and side wall mounted passive infrared sensors in place.

FIG. 5 is a top view of two oppositely positioned side mounted passive infrared sensors showing the overlapping infrared barrier curtains created therefrom.

FIG. 5A is a side view of FIG. 5.

FIG. 5B is a diagrammatic horizontal cross sectional view showing the two oppositely positioned side wall mounted passive infrared sensors in place.

DETAILED DESCRIPTION OF THE PREFERRED EMBODIMENTS

Figure 1:
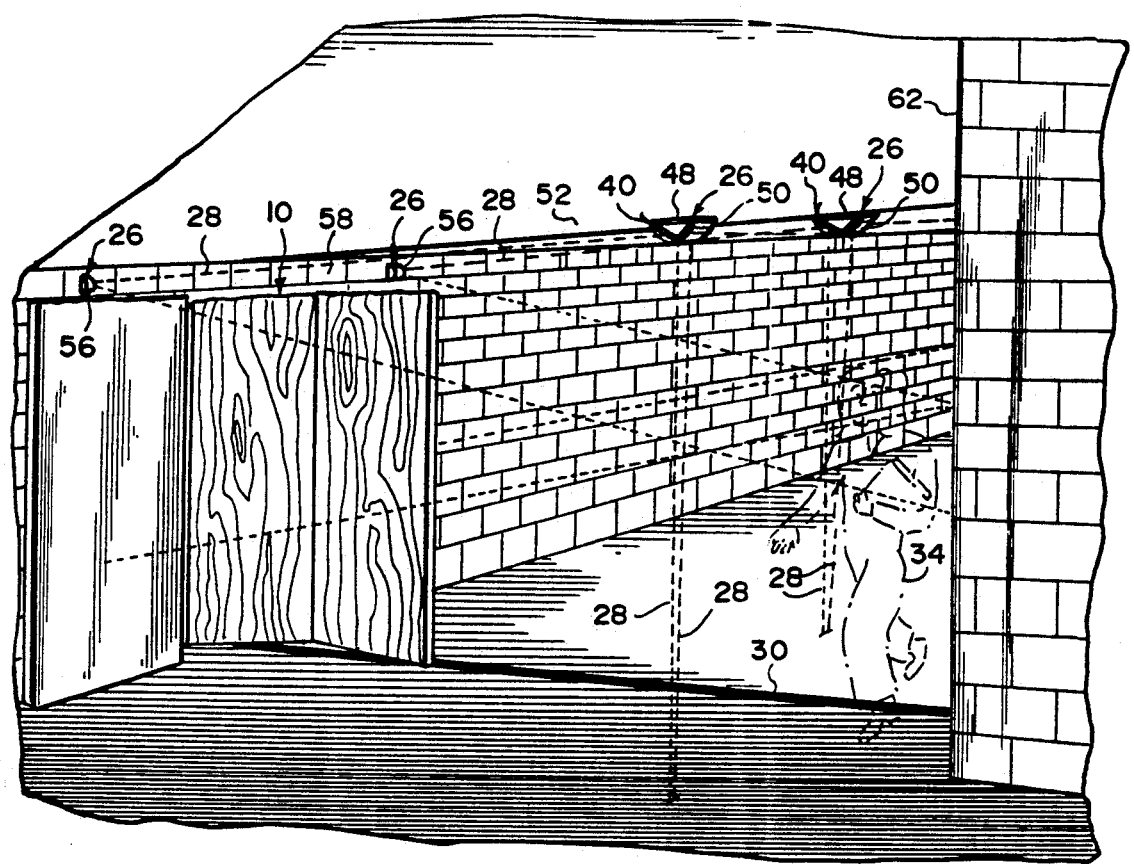
FIG. 1 is a perspective view showing the passive infrared sensors of the instant invention mounted to the ceiling or the side wall for creating the infrared barrier curtain at the operating path of the folding walls.
Figure 2:
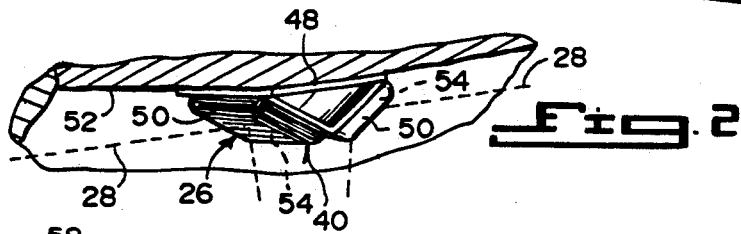
FIG. 2 is an enlarged perspective view of two of the ceiling mounted passive infrared sensors.
Figure 3:
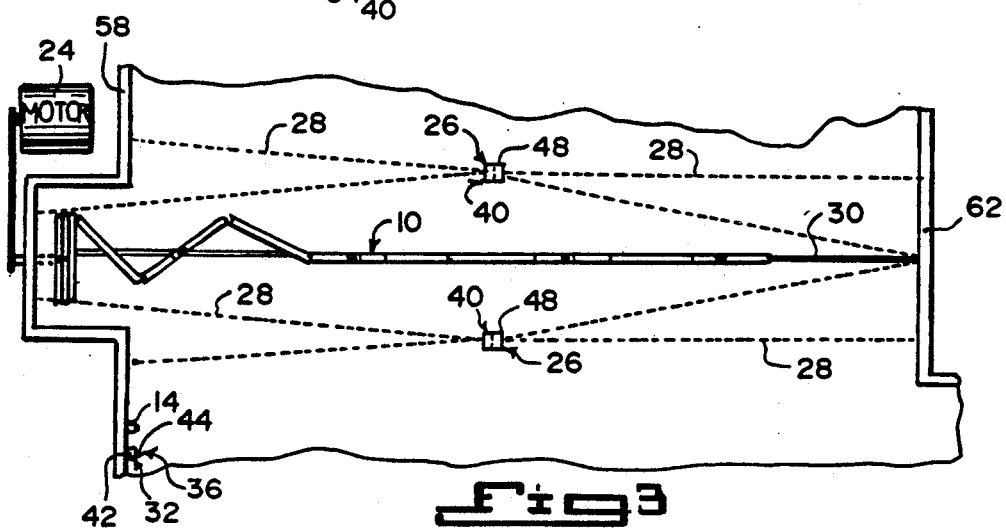
FIG. 3 is a diagrammatic horizontal cross sectional view showing the ceiling mounted passive infrared sensors in place.
Figure 6:
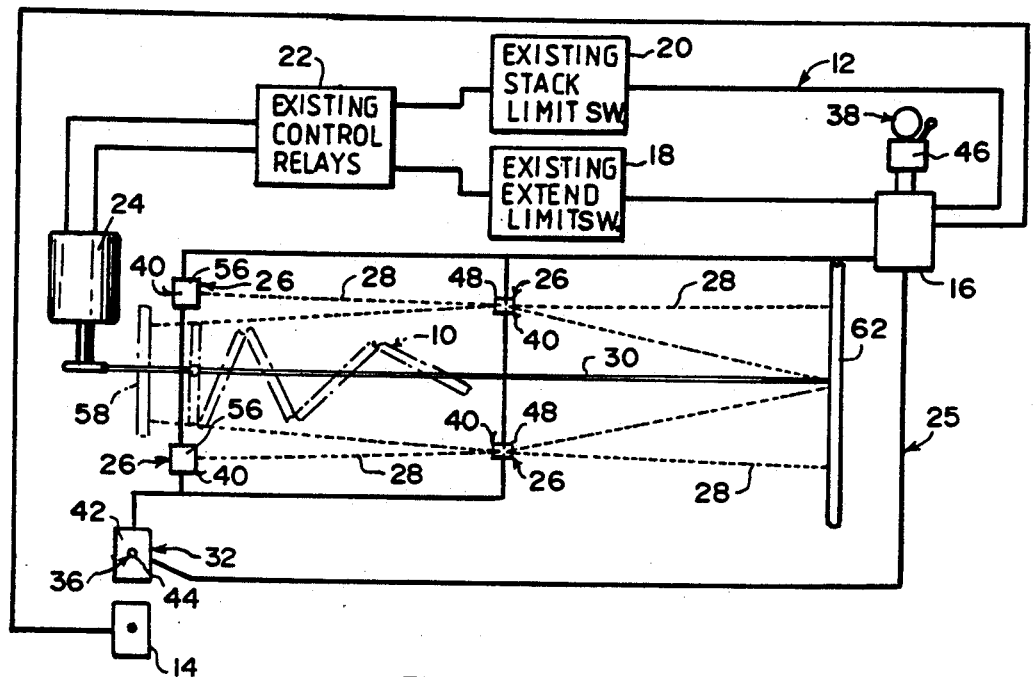
FIG. 6 is a schematic diagram showing the various electronic components of the instant invention.
Figure 7:
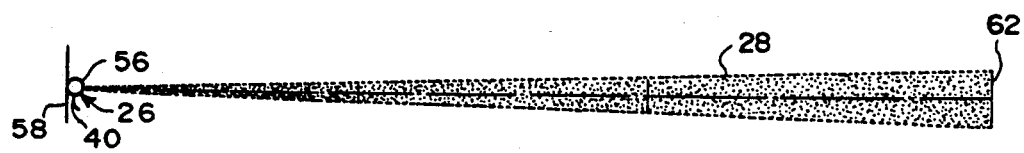
FIG. 7 is a top view of one side wall mounted passive infrared sensor showing the infrared barrier curtain created therefrom.
Figure 8:
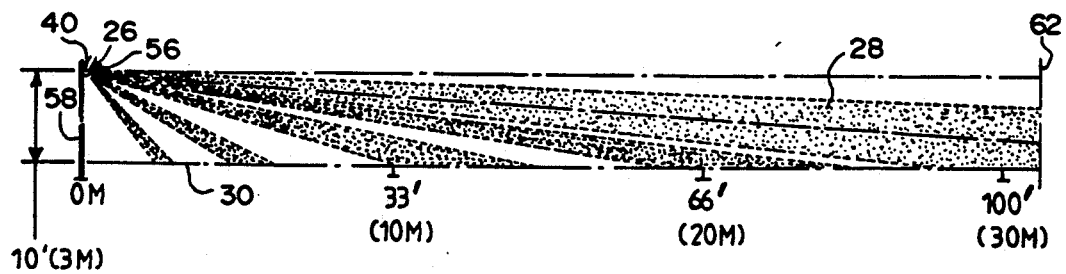
FIG. 8 is a side view of FIG. 7.

Turning now descriptively to the drawings, in which similar reference characters denote similar elements throughout the several views, the FIGURES illustrate electrically operated folding operable walls 10 controlled by an electrical operation circuit 12 of the type having a key switch 14, a control panel 16, an extend limit switch 18, a stack limit switch 20, control relays 22 and a motor 24. The invention is a safety system 25, which consists of a mechanism 26 for creating an infrared barrier curtain 28 on opposite sides of an operating path 30 of the folding operable walls 10. Another mechanism 32 is for shutting down the electrical operation circuit 12 of the folding operable walls 10, when a physical obstruction 34, such as a person or object, enter into the operating path 30 of the folding operable walls 10 and intercepts the infrared barrier curtain 28. Still another mechanism 36 is for restarting up the electrical operation circuit 12 of the folding operable walls 10, after the physical obstruction 34 is removed from the operating path 30 of the folding operable walls 10.

The electrically operated folding operable walls further includes a mechanism 38 for indicating to the operator of the electrical operation circuit 12, that the physical obstruction 34 has entered into the operating path 30 of the folding operable walls 10 and has interrupted the infrared barrier curtain 28.

The infrared barrier curtain creating mechanism 26 includes a plurality of passive infrared sensors 40, positioned on opposite sides of the operating path 30 of the folding operable walls 10. The sensors are electrically connected to the control panel 16 of the electrical operation circuit 12.

The shutting down mechanism 32 includes a rearm control unit 42 electrically connected between the control panel 16 of the electrical operation circuit 12 and the passive infrared sensors 40, which will turn off when the infrared barrier curtain 28 is interrupted.

The restarting up mechanism 36 includes a re-set control key switch 44 in the rearm control unit 42, which when turned on will reactivate the electrical operation circuit 12 and the passive infrared sensors 40. The reset control key switch 44 is located adjacent the key switch 14 of the electrical operation circuit 12 for easy access by the operator.

The operator indicating mechanism 38 is an alarm mechanism 46, electrically connected to the control panel 16 of the electrical operation circuit 12.

The passive infrared sensors 40 can be two mounting brackets 48, each having a pair of guards 50 secured at a forty-five degree angle to the center of a ceiling 52 at one opposite side above the operating path 30 of the folding operable walls 10. Four transmitter-receiver sensor units 54, are provided with each connected within one of the guards 50 of the mounting brackets 48. The two transmitter-receiver sensor units 54 on each mounting bracket 48 can create the infrared barrier curtain 28 on opposite sides of the operating path 30 of the folding operable walls 10.

The passive infrared sensors 40 can also be two transmitter-receiver sensor units 56, with each mounted on a stacked side wall 58 on an opposite side of the operating path 30 of the folding operable walls 10. The two transmitter-receiver sensor units 56 can create the infrared barrier curtain 28 on the opposite sides of the operating path 30 of the folding operable walls 10.

The passive infrared sensors 40 can also be four transmitter-receiver sensor units 60, with two mounted on a stacked side wall 58 on opposite sides of the operating path 30 of the folding operable walls 10 and two mounted on a distal side wall 62 on opposite sides of the operating path 30 of the folding operable walls 10. The two oppositely positioned transmitter-receiver sensor units 60 on each side of the operating path 30 of the folding operable walls 10 can create an overlapping infrared barrier curtain 18a thereacross.

To normally close the folding operable walls 10, the operator must follow these steps:

1. Turn the key switch 14 to a first position.
2. The first position on the key switch 14 will electrically connect through the control panel 16 to the extend limit switch 18, which will activate the proper control relays 22 to start the motor 24.
3. The folding operable walls 10 will then close along the operating path 30 and extend to the distal side wall 62.

To normally open the folding operable wall 10 the operator must follow these steps:

1. Turn the key switch 14 to a second position.
2. The second position on the key switch 14 will electrically connect through the control panel 16 to the stack limit switch 20 which will activate the proper control relays 22 to reverse the motor 24.
3. The folding operable walls 10 will now open along the operating path 30 and stack up to the stacked side wall 58.

To operate the safety system 25 the operator must follow these steps:

1. When a physical obstruction 34, such as a person, enters into the operating path 30 as the folding operable walls 10 are closing, the infrared barrier curtain 28 or 28a will be interrupted.
2. The passive infrared sensors 40 will sense the interruption and turn off the rearm control panel 16, which in turn will stop the motor 24.
3. The alarm mechanism 46 will sound to alert the operator.
4. The physical obstruction 34 is then removed from the operating path 30.
5. The operator can then activate the re-set control key switch 44, which will start the motor 24 to continue to close the folding operable walls 10.

LIST OF REFERENCE NUMBERS 10 electrical operated folding operable walls
12 electrical operation circuit
14 key switch
16 control panel
18 extend limit switch
20 stack limit switch
22 control relays
24 motor
25 safety system
26 creating mechanism
28 infrared barrier curtain
28a a overlapping infrared barrier curtain
30 operating path
32 shutting down mechanism
34 physical obstruction
36 restarting up mechanism
38 indicating mechanism
40 passive infrared sensor for 26
42 rearm control unit for 32
44 reset control key switch for 36
46 alarm mechanism for 38
48 mounting bracket
50 guard on 48
52 ceiling
54 transmitter-receiver unit
56 transmitter-receiver unit
58 stacked side wall
60 transmitter-receiver unit
62 distal side wall It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Electrically operated folding operable walls controlled by an electrical operation circuit of the type having a key switch, a control panel, an extend limit switch, a stack limit switch, control relays and a motor, in which the invention being a safety system comprises:

a) means for creating an infrared barrier curtain on opposite sides of an operating path of said folding operable walls, said infrared barrier curtain creating means includes a plurality of passive infrared sensors, positioned on opposite sides of the operating path of said folding operable walls, whereby said sensors are electrically connected to the control panel of the electrical operation circuit, said passive infrared sensors further include two mounting brackets, each having a pair of guards secured at a forty-five degree angle to the center of a ceiling at one opposite side above the operating path of said folding operable walls and four transmitter-receiver sensor units, with each connected within one of the guards of said mounting brackets, so that said two transmitter-receiver sensor units on each said mounting bracket can create the infrared barrier curtain on opposite sides of the operating path of said folding operable walls;

b) means for shutting down the electrical operation circuit of said folding operable walls when a physical obstruction enters into the operating path of said folding operable walls and interrupts the infrared barrier curtain, said shutting down means includes a rear control unit electrically connected between the control panel of the electrical operation circuit and said passive infrared sensors, which will turn off when the infrared barrier curtain is interrupted;

c) means for restarting up the electrical operation circuit of said folding operable walls after the physical obstruction is removed from the operating path of said folding operable walls, said restarting up means includes a reset control key switch in said rear control unit, which when turned on will reactivate the electrical operation circuit and said passive infrared sensors, said reset control key switch is located adjacent the key switch of the electrical operation circuit for easy access by the operator;

d) means for indicating to the operator of the electrical operation circuit that the physical obstruction has entered into the operating path of said folding operable walls and has interrupted the infrared barrier curtain, said operator indicating means is an alarm mechanism electrically connected to the control panel of the electrical operation circuit.

2. Electrically operated folding operable walls as recited in claim 1, wherein said passive infrared sensors include two transmitter-receiver sensor units, with each mounted on a stacked side wall on an opposite side of the operating path of said folding operable walls, so that said two transmitter-receiver sensor units can create the infrared barrier curtain on the opposite sides of the operating path of said folding operable walls.

3. Electrically operated folding operable walls as recited in claim 1, wherein said passive infrared sensors include four transmitter-receiver sensor units, with two mounted on a stacked side wall on opposite sides of the operating path of said folding operable walls and two mounted on a distal side wall on opposite sides of the operating path of said folding operable walls, so that said two oppositely positioned transmitter-receiver sensor units on each side of the operating path of said folding operable walls can create an overlapping infrared barrier curtain thereacross.

* * * * *